(12) United States Patent
Veselka

(10) Patent No.: US 8,423,439 B1
(45) Date of Patent: Apr. 16, 2013

(54) SERVICE FEE-BASED PAYMENT PROCESSING

(76) Inventor: Randall D. Veselka, Littleton, CO (US)

( * ) Notice: Subject to any disclaimer, the term of this patent is extended or adjusted under 35 U.S.C. 154(b) by 1215 days.

(21) Appl. No.: 11/753,351

(22) Filed: May 24, 2007

(51) Int. Cl.
*G09B 19/00* (2006.01)

(52) U.S. Cl.
USPC .............................................. 705/35; 705/36

(58) Field of Classification Search ................. 705/35, 705/36
See application file for complete search history.

(56) References Cited

U.S. PATENT DOCUMENTS

| | | | |
|---|---|---|---|
| 2002/0056746 A1* | 5/2002 | Glaser | 235/380 |
| 2004/0193537 A1* | 9/2004 | Knapp | 705/39 |
| 2006/0059087 A1* | 3/2006 | Smith et al. | 705/40 |
| 2006/0111956 A1* | 5/2006 | Whitesage | 705/8 |
| 2007/0051794 A1 | 3/2007 | Glanz et al. | |
| 2007/0241183 A1 | 10/2007 | Brown et al. | |
| 2008/0010213 A1* | 1/2008 | Roth | 705/65 |
| 2008/0052177 A1* | 2/2008 | Walker et al. | 705/21 |
| 2008/0103966 A1 | 5/2008 | Foster | |
| 2008/0275760 A1* | 11/2008 | Easterly et al. | 705/10 |

OTHER PUBLICATIONS

"Top Australian Bank Regulator Defends Interchange Regulation", Digital Transactions—Trends in the Electronic Exchange of Value, Dated Aug. 16, 2005, Internet site http://www.1800bankcard.com (2 pages).
"Convenience Fee", Copyright© Official Payments Corporation, Internet site http://www.officialpaymentscorp.com (1 page).
"Rumblings From the Public Sector" by Richard Mitchell, Merchant Acquiring, Credit Card Management pp. 18-22 (3 pages).
"Pop Wordige for Visual Gov Solutions, LLC." Flyer (1 page).
"Interchange Litigation Moves Forward, Cases Consolidated", News, p. 59 (1 page).
"Discover to Drop 'No Surcharge' Ban", News, pp. 96-97 (2 pages).
"More Aussie Retailers Plan Surcharges for Credit Card Payments", Digital Transactions—Trends in the Electronic Exchange of Value, Dated Mar. 27, 2006, Internet site http://www.1800bankcard.com (1 page).
"Report Sees Heavier Pressure to Cut Interchange" by Isabelle Lindenmayer, American Banker, Wednesday Mar. 29, 2006, p. 12 (1 page).
Non-Final Office Action dated Oct. 5, 2010 in U.S. Appl. No. 11/753,358. (21 pages).

* cited by examiner

*Primary Examiner* — Eric T. Wong
*Assistant Examiner* — John Anderson
(74) *Attorney, Agent, or Firm* — Bejin, VanOphem & Bieneman PLC

(57) ABSTRACT

A set of average transaction amounts is established. For each of the average transaction amounts, a total transaction cost is determined. An intended per-transaction profit is established. A service fee is established for each of the average transaction amounts based on the average transaction amount and the intended per-transaction profit.

23 Claims, 6 Drawing Sheets

Fee matrix
140

| Service fee 205 | Avg. trans. amt. 210 | Interchange / proc. fee 215 | Other costs 220 | Total trans. cost 225 | Trans. profit 230 |

FIG. 2

Batch report 300

EDC1
- Card type 1 amount
- Card type 2 amount
- Card type 3 amount
- Number of transactions
- Total transaction amount
- Total service fee
- Net deposit amount

⎫ 305

EDC2
- Card type 1 amount
- Card type 2 amount
- Number of transactions
- Total amount
- Net deposit amount

⎫ 310

Total transaction amount (all EDCs)
Total number of transactions (all EDCs)

SERVICE FEE-BASED PAYMENT PROCESSING

RELATED APPLICATIONS

This application is related to United States patent application entitled "PAYMENT TERMINAL PROCESSING," Ser. No. 11/753,358, filed the same day as the present application and now abandoned, which application is hereby fully incorporated herein by reference in its entirety.

BACKGROUND

Payment cards, e.g., debit cards, credit cards, and the like, provide a convenient and widely used payment mechanism at merchant locations around the world. Consumers do not generally pay a separate or explicit fee for the use of payment cards. However, a merchant generally pays a percentage-based transaction fee in order to receive payment on the transaction. For example, the merchant generally pays a fee, sometimes referred to as an interchange fee, to an issuing institution, e.g., a bank issuing a credit card. Further, the merchant generally pays a processing fee to a processor handling a transaction on behalf of the issuing institution. The interchange fee and also the processing fee are generally based on a percentage of the transaction's value, and hence constitute a percentage-based transaction fee.

A merchant may conduct many transactions in which a payment card is not used, even as a payment card is used for some of the merchant's transactions. For example, many merchant accept cash or checks in addition to payment cards. Others may also or alternatively send invoices to their customers. In any event, because percentage-based transaction fees must be paid by a merchant, the merchant may offer goods and services at a higher price than would otherwise be the case in order to pay transaction fees for transactions in which a customer uses a payment card. Further, payment card issuers generally do not allow merchants paying a percentage-based transaction fee to charge payment card customers a different price for goods and services than other customers, e.g., cash customers, pay. Therefore, merchants presently must price goods and services for all transactions to accommodate the subset of transactions in which a consumer uses a payment card. As a result, merchants and consumers alike bear higher transaction costs to accommodate the subset of transactions in which a payment card is utilized.

Transactions using a payment card are very often conducted electronically. A merchant location may have one or more terminal devices equipped to read data from a magnetic strip on a payment card, e.g., when the card is "swiped." A terminal device may be connected to a network, and may thereby communicate with the processor. The processor may in turn communicate with the issuing institution via the network or some other network. Communications between a terminal device, a processor, and/or an issuing institution often occur substantially in real-time.

Processing rules for different payment cards may be different. For example, present merchant terminals may be configured to process credit card transactions differently than debit card transactions. However, where different kinds of payment cards fall into a same category, e.g., credit cards, present merchant terminals generally process the different kinds of payment cards in the category, e.g., MasterCard, Visa, Discover, etc., in a like manner. In particular, a merchant terminal configured to process credit cards according to a percentage-based transaction fee is presently unable to process credit cards according to a flat fee. Similarly, a merchant terminal configured to process debit cards according to a percentage-based transaction fee is presently unable to process credit cards according to a flat fee.

BRIEF DESCRIPTION OF THE DRAWING FIGURES

FIG. 2 illustrates an exemplary fee matrix.

FIG. 3 illustrates an exemplary batch report.

DETAILED DESCRIPTION OF THE PREFERRED EMBODIMENTS

System Overview

Figure 1:
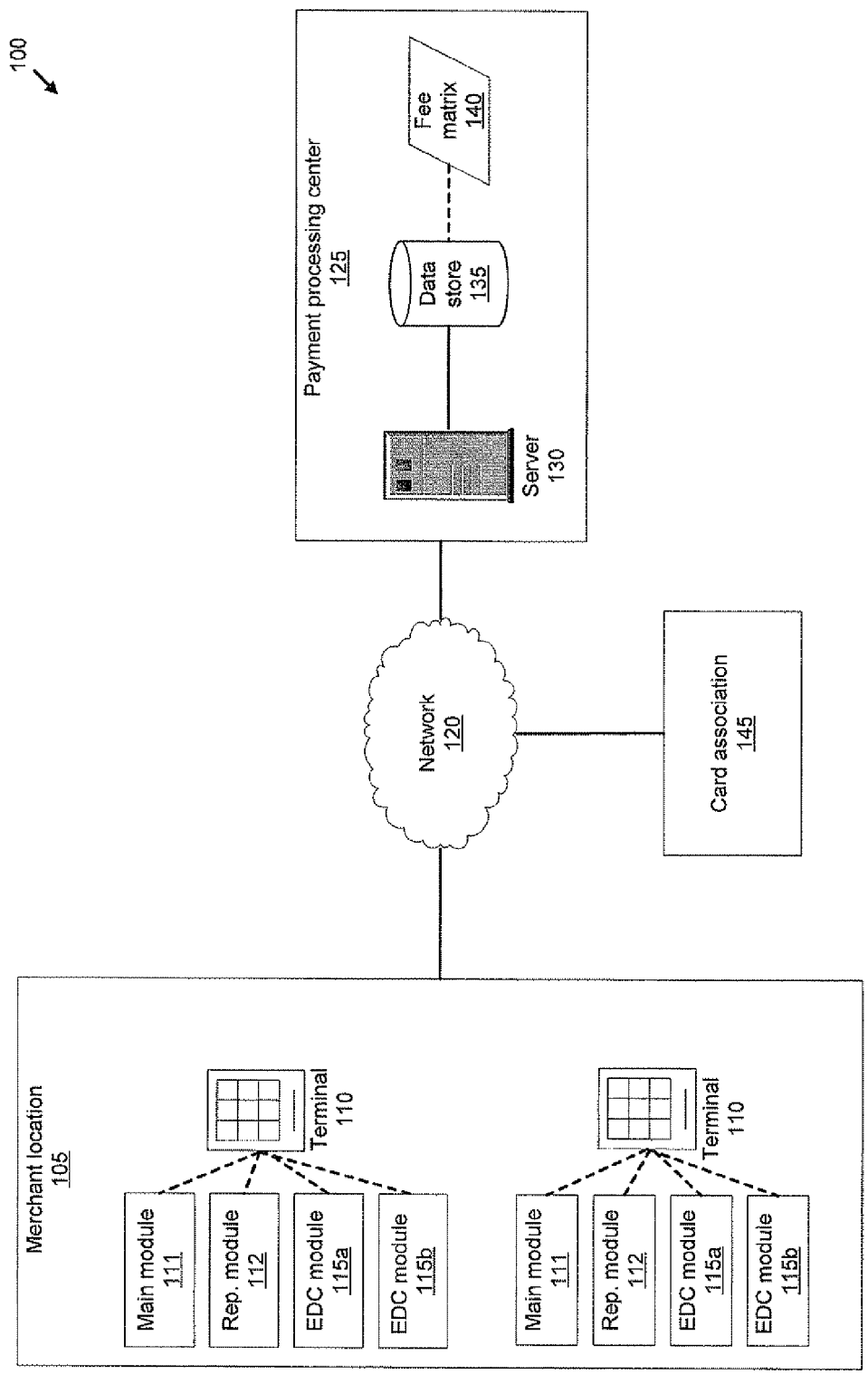
FIG. 1 illustrates an exemplary system for conducting a transaction using a payment card.

FIG. 1 illustrates an exemplary system 100 for conducting a transaction using a payment card. A merchant 105 includes one or more payment terminals 110, which in turn each include various sets of program instructions, such as a main module 111, a reporting module 112, and one or more electronic draft capture (EDC) modules 115. Terminals 110 communicate with a payment processing center 125 via a network 120. Payment processing center 125 generally includes a processing server 130 and a data store 135. Fee matrix 140, used to determine flat fees applied to transactions from various merchants 105, may be stored in data store 135. Card association 145 may also be in communication with payment processing center 125 via the network 120, or some other network.

Merchant 105 may include a location, or a set of locations, associated with a particular entity, e.g., a particular business, including one or more payment terminals 110. Further, as stated below, merchant 105 may be a virtual merchant with virtual terminals 110. Although only one merchant 105 is illustrated in FIG. 1, it is to be understood that, in general, system 100 is likely to include tens, hundreds, thousands, or even more merchants 105, each merchant 105 including one or more terminals 110.

Payment terminal 110 may be a virtual terminal, i.e., a customer may purchase goods or services through a website or the like and may provide information sufficient to pay for the goods or services using a payment card through a form or the like provided within the website. However, where payment terminal 110 is a physical device located within a merchant 105, payment terminal 110 may be a known device such as the NURIT 2085 or NURIT 8320, both sold by VeriFone, Inc. of San Jose, Calif. Accordingly, in addition to EDC modules 115, payment terminal 110 may include known software provided by VeriFone such as the NURIT operating system (NOS) and the NURIT control Center (NCC).

A single payment terminal 110 is generally configured to process different kinds of payment cards, e.g., credit cards and debit cards. For example, a payment terminal 110 may be configured to process Visa, American Express, Discover, and MasterCard credit cards, as well as debit cards usable through networks provided by Visa, MasterCard, Star System, Pulse, etc.

Main module 111 includes program instructions for performing operations such as described below. For example, main module 111 includes instructions for obtaining information concerning a payment card, detecting a type of payment card, and selecting an appropriate EDC module 115, among other operations.

Figure 7:
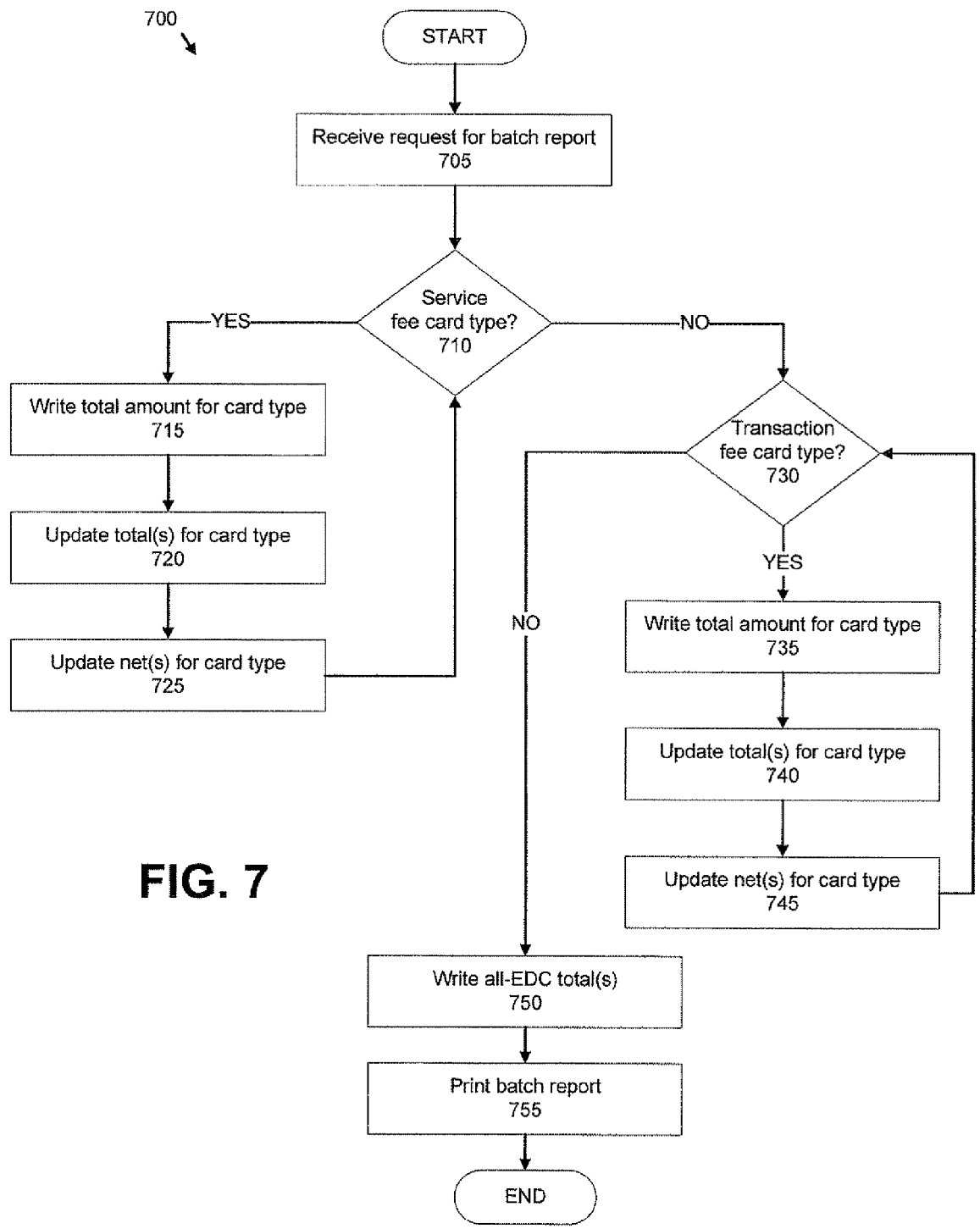
FIG. 7 illustrates an exemplary process whereby a batch report, such as the batch report of FIG. 3, may be generated.

Reporting module 112 includes program instructions for generating reports such as batch report 300, discussed further below with respect to FIGS. 3 and 7.

EDC modules 115 and other program instructions included in terminals 110 may be created according to any one of a variety of known programming technologies, such as the C programming language. For example, the MetaWare Compiler, sold by ARC International of San Jose, Calif. and St. Albans, United Kingdom, may be used to compile and link code for EDC modules 115 and/or other modules in terminal 110. As illustrated in FIG. 1, multiple EDC modules 115 may be included within a single terminal 110. For example, a first EDC module 115a may be used to process a first type of payment card transaction, while a second EDC module 115b is used to process a second type of payment card transaction through a terminal 110 that includes both EDC modules 115. Operations carried out at least in part according to instructions included in one or more EDC modules 115 are described in more detail below.

Network 120 is a packet network and is generally an internet protocol (EP) network. As such, network 120 generally uses one or more known protocols for transporting data, such as user datagram protocol (UDP), transport control protocol (TCP), hypertext transfer protocol (HTTP), etc. Further, network 120 may include a variety of networks such as a wide area network (WAN), e.g., the Internet, a local area network (LAN), etc. In some cases, an addition or alternative to network 120 may be created by instantiating a dial up connection over conventional telephone lines, e.g., between data center 120 and card association 140. As is known, packet network 120 may be used to transport a variety of digital data.

Payment processing center 125 generally includes a payment server 130 and a payment data store 135. Further, it is to be understood that, for purposes of efficiency, scalability, and redundancy, payment processing center 125 generally includes multiple devices performing operations ascribed herein to payment server 130 and payment data store 135. Payment server 130 and payment data store 135 may include various software that includes instructions for performing some or all of the operations described herein. Fee matrix 140, discussed further below, e.g., with reference to FIG. 2, is generally included in payment data store 135, e.g., as one or more relational tables. Payment processing center 125, generally via server 130, may be in communication with terminals 110 and card association 145 via one or more networks such as network 120.

Card association 145 as illustrated in FIG. 1 represents a processing center of a payment card provider, e.g., Visa, MasterCard, etc. It is to be understood that the system 100 will generally include multiple card associations 145, although only one card association 145 is illustrated in FIG. 1 for convenience and ease of explanation herein. As described further below, payment processing center 125 may communicate with card association 145 for various purposes, such as authorizing payment card transactions requested from a merchant 105, settling transactions with card association 145, etc.

Computing devices such as terminals 110, server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., the Linux operating system, and the NURIT operating system (NOS) mentioned above. Computing devices may include any one of a number of known computing devices, including, without limitation, a point of sale terminal, a computer workstation, a desktop, notebook, laptop, or handheld computer, or some other known computing device.

Computing devices generally each include instructions executable by one or more computing devices such as those listed above. Computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein such as data store 140, may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and is accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Fee Matrix

FIG. 2 illustrates an exemplary fee matrix 140. As shown in FIG. 2, fee matrix 140 includes the following columns or fields: a service fee 205, an average transaction amount 210, an interchange/processing fee 215, other costs 220, a total transaction cost 225, and a transaction profit 230.

Service fee 205 is a flat fee, i.e., a fee of a predetermined amount where the fee is not determined by the amount of a transaction and in fact is independent of the amount of the transaction. Service fee 205 may be paid, by a user of a payment card, to merchant 105 as consideration for processing a payment card transaction, which service fee 205 is ultimately collected by payment processing center 125. As described further below, an amount of a service fee 205 to be paid by payment card users completing a transaction at a particular merchant 105 may be determined according to an average transaction amount 210 associated with the merchant 105.

As noted above, system 100 likely includes multiple merchants 105. An average transaction amount 210 may be associated with each merchant 105 by calculating a total amount, i.e., an amount of money, of all payment card transactions at the merchant 105 within a given time period, and then dividing that total amount by the number of payment card transactions at the merchant 105 within the given time period. For purposes of fee matrix 140, it is generally desirable to round the result of the foregoing calculation, e.g., up to the nearest dollar amount as illustrated below with respect to Table 1. Average transaction amounts 210 associated with different merchants 105 may vary according to a variety of factors, such as demographic attributes of customers patronizing the merchant 105, geographic location of the merchant 105, type of business of the merchant 105, etc.

Interchange/processing fee 215 is generally determined by card association 145, and represents an amount to be paid to card association 145 by processing center 125 as consideration for completing a payment card transaction. Interchange/processing fee 215 is generally based on a percentage of a total transaction amount, although the percentage is not generally dependent on the total transaction amount. Accordingly, interchange/processing fee 215 sometimes may be calculated simply by multiplying a total transaction amount by the percentage specified by a card association 145. Often, however, interchange/processing fee 215 is the sum of a predetermined constant and the product of a total transaction amount and a percentage specified by a card association 145. One purpose of the predetermined constant is generally to ensure that a transaction fee does not fall below a predetermined threshold even for very small transactions. For example, if the interchange/processing fee 215 is based on a percentage of three percent, transaction amounts of one dollar and two dollars respectively would result in interchange/processing fees 215 of three cents and six cents respectively. However, including a predetermined constant of twenty-five cents significantly increases the foregoing interchange/processing fees 215 to twenty-eight cents and thirty-one cents respectively. In any event, it may be seen that, in general, interchange/processing fee 215 will increase in direct proportion to a total transaction amount.

Other costs 220 represent costs for a payment card transaction other than interchange forward/processing fee 215 that must be paid to a card association 145 by payment processing center 125. For example, payment processing center 125 may pay agent's fees or commissions to agents or sales representatives who assist in obtaining merchants 105 as customers. Such fees or commissions may be included in other costs 220.

Total transaction cost 225 includes the sum of interchange/processing fee 215 and other costs 220. Cost 225 is used to determine estimated transaction profit 230.

Estimated transaction profit 230 is calculated by determining the difference between service fee 205 and total transaction costs 225. In general, the matrix 140 is created with the goal that estimated transaction profit 230 is a positive number. That is, in general terms, payment processing center 125 preferably achieves a profit from processing payment card transactions. However, for a given average transaction amount 210, some or all of total transaction costs 225, e.g., interchange/processing fee 215, is outside the control of payment processing center 125. Therefore, a key aspect of creating fee matrix 140 is to establish service fee amounts 205 corresponding to ranges of average transaction amounts 210 that are likely to generate positive transaction profits 230. In this way, as noted above, an amount of a service fee 205 for a merchant 105 will be based on an average transaction amounts 210 associated with the merchant 105.

Table 1 below illustrates a fee matrix 140 that includes service fees 205 for average transaction amounts 210 from one dollar to ten dollars. In essence, each line of the fee matrix 140 represents a range of average transaction amounts 210. For example, the first service fee 205 listed in Table 1, one dollar and fifty-three cents, is in essence associated with average transaction amounts 210 ranging from one cent to one dollar. The second service fee listed in Table 1, one dollar and fifty-six cents, is in essence associated with average transaction amounts 210 ranging from one dollar and one cent to two dollars, etc. It will be understood that it is neither practical nor necessary to establish a fee matrix 140 that includes a line for every possible average transaction amount 210, e.g., that lists average transaction amounts 210 in one-cent increments.

The service fees 205 shown in Table 1 are established according to the assumption that a goal of payment processing center 125 is to realize a profit per transaction of one dollar, regardless of the average transaction amount 210 associated with a merchant 105. The interchange/processing fees 215 shown in Table 1 are based on a percentage of three percent and a predetermined constant of twenty-five cents. Other costs 220 are assumed in Table 1 to be a flat twenty-five cents per transaction, regardless of the average transaction amount 210, although other costs 220 could easily vary with average transaction amount 210, or could be omitted altogether. It is to be understood that the numbers included in Table 1 are purely exemplary, and that real-world implementations may include different values for any of the fields 205, 210, 215, 220, 225, or 230 represented in Table 1.

TABLE 1

| Service fee | Avg. Trans Amt | Interchange Fee | Other costs | Tot. Trans. Cost | Trans. Profit |
|---|---|---|---|---|---|
| $1.53 | $1.00 | $0.28 | $0.25 | $0.53 | $1.00 |
| $1.56 | $2.00 | $0.31 | $0.25 | $0.56 | $1.00 |
| $1.59 | $3.00 | $0.34 | $0.25 | $0.59 | $1.00 |
| $1.62 | $4.00 | $0.37 | $0.25 | $0.62 | $1.00 |
| $1.65 | $5.00 | $0.40 | $0.25 | $0.65 | $1.00 |
| $1.68 | $6.00 | $0.43 | $0.25 | $0.68 | $1.00 |
| $1.71 | $7.00 | $0.46 | $0.25 | $0.71 | $1.00 |
| $1.74 | $8.00 | $0.49 | $0.25 | $0.74 | $1.00 |
| $1.77 | $9.00 | $0.52 | $0.25 | $0.77 | $1.00 |
| $1.80 | $10.00 | $0.55 | $0.25 | $0.80 | $1.00 |

Process Flows

Figure 4:
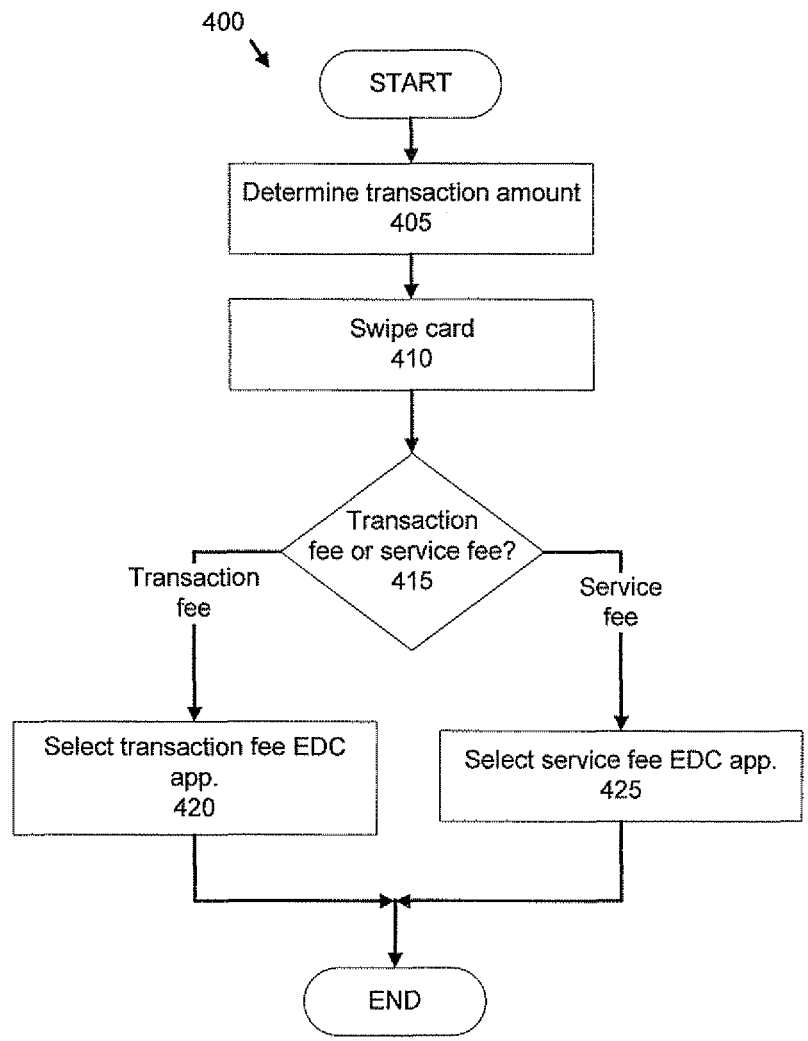
FIG. 4 illustrates an exemplary process for selecting an EDC application to process a payment card transaction in a terminal.

FIG. 4 illustrates an exemplary process 400 for selecting an EDC module 115 to process a payment card transaction in a terminal 110. Terminal 110 generally includes a computer-readable medium that includes instructions for carrying out operations described herein, including operations in process 400. For example, such instructions may be included in main module 111.

Process 400 begins in a step 405 when a transaction is initiated in a terminal 110. Generally, initiating a transaction in a terminal 110 includes entering a transaction amount into terminal 110, e.g., using a numeric keypad or some other known mechanism provided as part of or in conjunction with terminal 110.

Next, in step 410, information concerning a payment card is provided to terminal 110, generally by a customer or employee of merchant 105 swiping the payment card through a magnetic card reader, using radio-frequency identification (RFID) to read a tag, e.g., a chip, in a payment card, etc., thereby allowing terminal 110 to obtain information from a magnetic strip included on the payment card. However, other known mechanisms may be used to provide information concerning the payment card to the terminal 110, such as manual entry of information, etc. In any event, information obtained in step 410 may include a unique identifier for the payment card, e.g., a card number, a name of a cardholder, a type of card, e.g., debit or credit, and/or MasterCard, Visa, American Express, Discover, etc.

Next, in step 415, terminal 110 determines whether the payment card for which information was provided in step 410 should be charged a service fee or a percentage-based transaction fee for the transaction initiated in step 405. As discussed above, different types of payment cards may be charged different kinds of fees, e.g., service fees or percentage-based transaction fees, for payment card transactions. Information concerning a kind of fee to be charged for different kinds of payment cards, i.e., information concerning whether respective types of payment cards fall into a percentage-based transaction fee category or a service fee 205 category, may be stored in memory or a medium included in terminal 110. Further, such information may be included as data on a magnetic strip on a payment card, or may be obtained by terminal 110 through some other mechanism, such as a query to payment processing center 125. In any event, if a transaction fee is to be charged, step 420 is executed next. However, if a service fee is to be charged, step 425 is executed next.

In step 420, terminal 110 invokes a first EDC module 115 that is configured to process payment cards according to a percentage-based transaction fee. Systems and methods for processing payment cards according to a percentage-based transaction fee are generally known, and are not discussed in detail herein.

In step 425, terminal 110 invokes a second EDC module 115 that is configured to process payment cards according to a service fee. Processing of payment cards according to a service fee is discussed in more detail elsewhere herein, including with respect to FIGS. 2, 5, and 6.

Following either of steps 420 or 425, process 400 ends.

Figure 5:
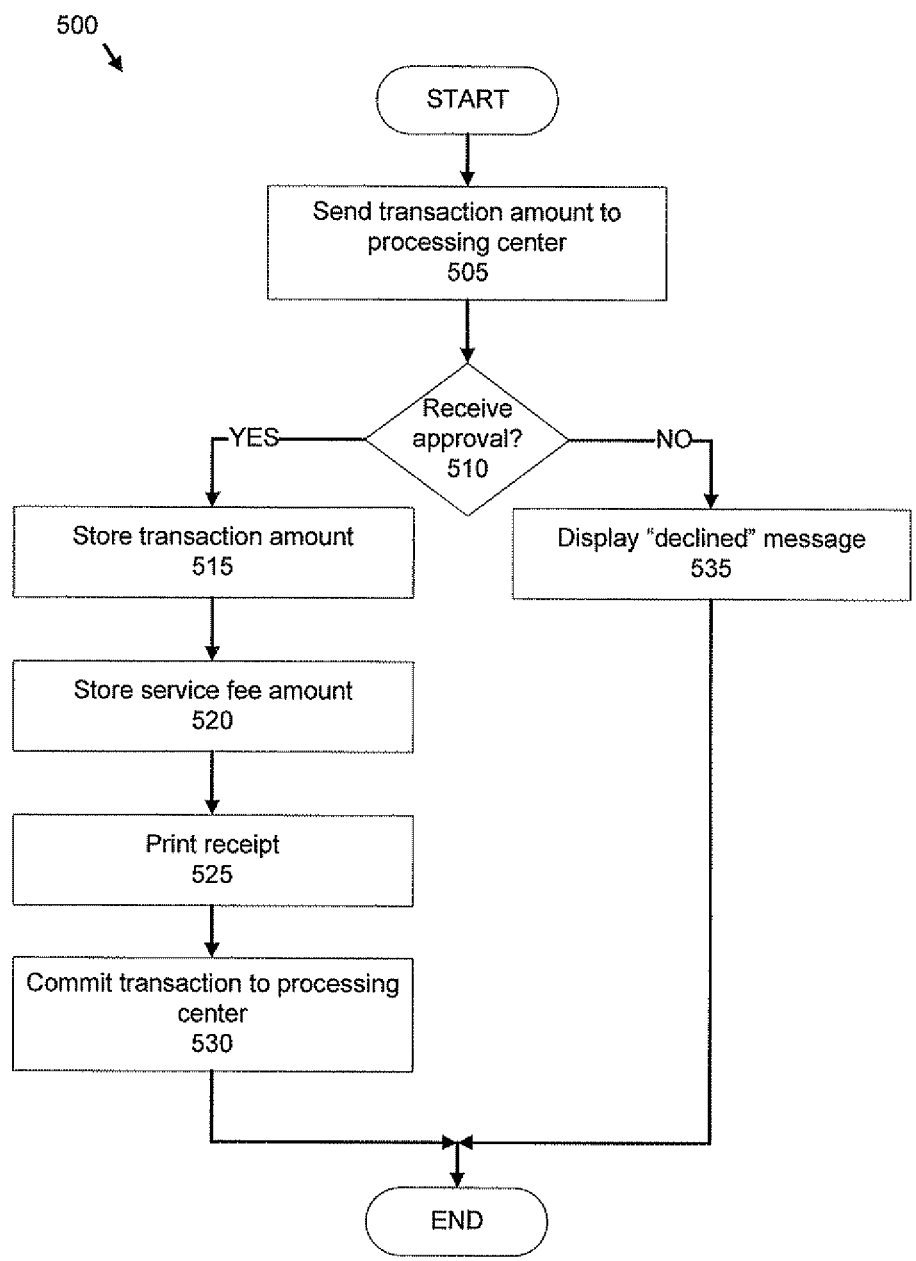
FIG. 5 illustrates an exemplary process for processing a payment card transaction using an electronic draft capture (EDC) application configured to charge a service fee.

FIG. 5 illustrates an exemplary process 500 for processing a payment card transaction using an electronic draft capture (EDC) module 115 configured to charge a service fee 205.

Process 500 begins in a step 505 when terminal 110, according to instructions in the EDC module 115, sends a transaction amount to payment processing center 125.

Next, in step 510, the EDC module 115 determines whether an approval of the transaction has been received from payment processing center 125. Steps by which payment processing center 125 may determine whether to provide such approval are discussed further below with respect to FIG. 6. If a transaction, including the transaction amount provided as described above with respect to step 505, is approved, then step 515 is executed next. Otherwise, step 535 is executed next.

In step 515, EDC module 115 causes a transaction amount, i.e., the amount provided as described above with respect to step 505, to be stored in a memory or on other media included in terminal 110.

Next, in step 520, EDC module 115 causes an amount of a service fee 205 to be stored in a memory or on other media included in terminal 110. Generally, EDC module 115 will be configured to store a predetermined service fee 205 according to a type of payment card that has been detected, e.g., as described above with respect to FIG. 4. To take just one example, a first service fee 205 may be applied to transactions involving Visa credit cards, while a second service fee 205 may be applied to transactions involving MasterCard debit cards. Further, it is also possible that EDC module 115 may be configured to store a predetermined service fee 205 that is common to two or more types of payment cards. Moreover, an amount of a service fee 205 may be provided from payment processing center 125, rather than being stored in a memory of terminal 110 and/or being included in program instructions of EDC module 115.

In any event, in step 520, an amount of a service fee 205 is stored in terminal 110, and is associated with an identifier for a particular transaction, where information stored concerning the transaction includes the transaction amount stored in step 515, along with an indication of a type of payment card used for the transaction. Such information is stored, among other things, for reporting purposes, e.g., to create batch report 300 discussed above, and also so that necessary information concerning a transaction may be communicated to payment processing center 125, e.g., as described below with respect to step 530.

Next, in step 525, terminal 110 may print a receipt to be provided to a customer. Such receipt may show a total transaction amount, including an amount paid for goods and/or services, applicable tax, and/or an amount of the applicable service fee 205.

Next, in step 530, EDC module 115 causes the transaction to be committed to payment processing center 125, as is known, transactions may be committed from terminal 110 to payment processing center 125 in debt, or on a real-time or near real time basis. That is, a transaction may be sent to payment processing center either as a host closed sale (HCS) transaction, or as a terminal closed sale (TCS) transaction.

As discussed above, in addition to step 515, step 535 may follow step 510. In step 535, EDC module 115 causes terminal 110 to display a "declined" message or the like, indicating that approval for a transaction requested as described above with respect to step 505 has not been received from payment processing center 125.

Following either step 530 or step 535, process 500 ends.

Figure 6:
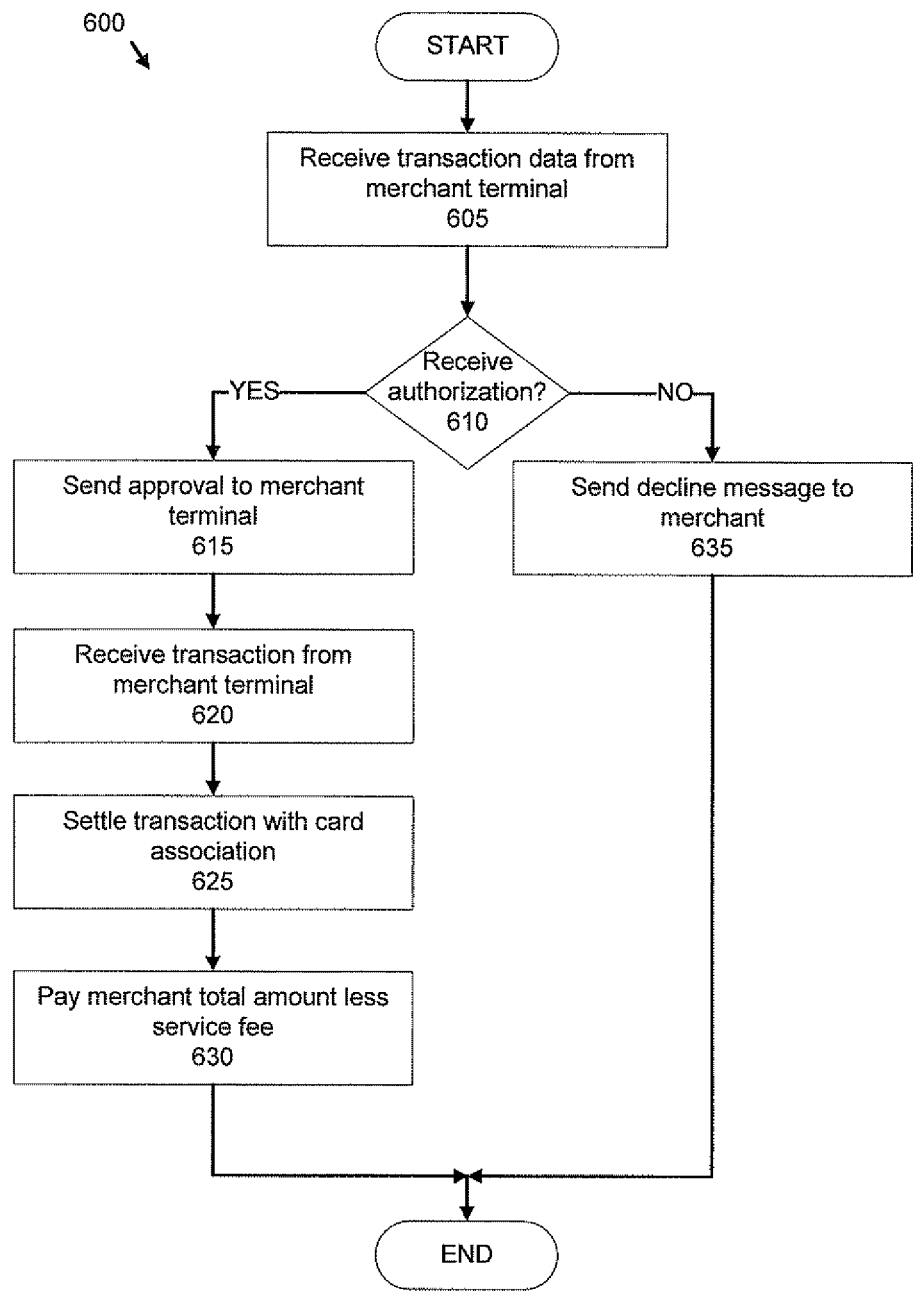
FIG. 6 illustrates an exemplary process for a payment processing center to process a payment card transaction that includes a service fee.

FIG. 6 illustrates an exemplary process 600 for payment processing center 125 to process a payment card transaction that includes a service fee 205. It will be understood that certain operations attributed in this patent application to payment processing center 125 may be carried out as appropriate by server 130 and/or data store 135.

Process 600 begins in a step 605 when payment processing center 125 receives data relating to a payment card transaction from a merchant terminal 110.

Next, in step 610, payment processing center 125 attempts to obtain, from card association 145, authorization for the transaction communicated in step 605. If such authorization is obtained, step 615 is executed next. Otherwise, step 635 is executed next.

In step 615, payment processing center 125 sends an indication to terminal 110 that the transaction for which information was provided in step 605 is approved.

Next, in step 620, payment processing center 125 receives information from merchant terminal 110 indicating that the transaction has been completed. Such information, in addition to identifiers and the like for the transaction, the payment card used in the transaction, merchant 105, terminal 110, etc., generally includes a total transaction amount, as well as an amount of a service fee 205 included in the total transaction amount.

Next, in step 625, payment processing center 125 settles the transaction with card association 145. Settlement processes for payment card transactions are well known. In settling a transaction with card association 145 according to process 600, payment processing center 125 provides to card association 145 a total transaction amount that includes an amount paid for goods and/or services, any applicable tax, and also the applicable interchange/processing fee 210. Accordingly, from the perspective of card association 145, it is irrelevant that process 600 involves a transaction using a service fee 205. Even in a transaction involving a service fee 205, card association 145 receives an interchange/processing fee 215, just as it would for any other transaction.

Next, in step 630, payment processing center 125 pays to merchant 105, e.g., according to Automated Clearing House (ACH) mechanisms such as are known, a total transaction amount less the applicable service fee 205. The amount paid according to step 630 may sometimes be referred to as a "net deposit amount" for the transaction. As mentioned above with respect to FIG. 2 and Table 1, a goal of payment processing center 125 is to establish a service fee 205 for a particular merchant 105 such that, on average, the service fee 205 will be greater than the applicable interchange/processing feet 215, plus any other costs 220.

As discussed above, in addition to step 615, step 635 may follow step 610. In step 635, payment processing center 125 send a message to merchant terminal 110 indicating that authorization has been declined for the transaction indicated as described above with respect to step 605.

Following either step 630 or step 635, process 600 ends.

Batch Reports

FIG. 3 illustrates an exemplary batch report 300, such as may be produced by a terminal 110 according to instructions included therein. Batch reports 300 provide a user at merchant 105 with information concerning transactions processed, in a given period of time, e.g., one business day, using respective EDC modules 115 included within the terminal 110. For example, the batch report 300 shown in FIG. 3 includes a first sub-report 305 concerning transactions processed by a first EDC module 115, a second sub-report 310 concerning transactions processed by a second EDC module 115, and a third sub-report 315 concerning transactions processed by both the first EDC module 115 and the second EDC module 115, i.e., summarizing all transactions processed through the terminal 110 providing the batch report 300.

In the example of FIG. 3, the first EDC module 115 is responsible for processing payment card transactions conducted with a first category of payment cards. Payment cards in the first category are those for which a flat fee, e.g., service fee 205, is charged to a holder of the payment card. Accordingly, sub-report 305 includes fields for showing total transaction amounts in the given period of time related to each of one or more card types included in the first category, three card types in the example of sub-report 305 illustrated in FIG. 3, processed by the first EDC module 115. Sub-report 305 also includes a field for showing a total number of transactions processed by the first EDC module 115 in the given period of time. Related to those transactions, sub-report 305 also includes fields for showing a total amount of the transactions, a total amount of service fees charged to customers for the transactions, and a net deposit amount credited to merchant 105 based on the transactions.

Further in the example of FIG. 3, the second EDC module 115 is responsible for processing payment card transactions conducted with a second category of payment cards. Payment cards in the second category are those for which a percentage-based transaction fee, e.g., an interchange/processing fee 215, is charged to merchant 105. Accordingly, sub-report 310 includes fields for showing total transaction amounts in the given period of time related to each of one or more card types included in the second category, two card types in the example of sub-report 310 illustrated in FIG. 3, processed by the second EDC module 115. Sub-report 310 also includes a field for showing a total number of transactions processed by the second EDC module 115 in the given period of time. Related to those transactions, sub-report 305 also includes fields for showing a total amount of the transactions, and a net deposit amount credited to merchant 105 based on the transactions.

Sub-report 315 includes a field for showing a total amount of transactions processed by all EDC modules 115 reflected on batch report 300, and also a field for showing a total number of transactions processed by all EDC modules 115 reflected on batch report 300. Thus, in the example of FIG. 3, the total transaction amount of sub-report 305 and the net transaction amount of sub-report 310, which is also a total transaction amount, may be summed to provide the total amount of transactions shown on sub-report 315. Further, the number of transactions shown on sub-report 305 and the number of transactions shown on sub-report 310 may be summed to provide the total number of transactions shown on sub-report 315.

Terminal 110 generally includes instructions for generating batch report 300, e.g., instructions included in reporting module 112. FIG. 7 illustrates an exemplary process 700 whereby a batch report, such as the batch report 300 of FIG. 3, may be generated.

Process 700 begins in a step 705, in which terminal 110 receives a request for a batch report 300. Such request may be received in a variety of known ways, e.g., by input from a dedicated button or key on terminal 110. Batch reports 300 are generally prepared to include information relating to a predetermined period of time, e.g., a business day, the time since terminal 110 was last powered off, etc., although it is possible that input received in step 705 could specify a time period or other parameters for a batch report 300. For example, such other parameters may include specifying that batch report 300 should include information relating only to particular kinds of payment cards, transactions over or under a certain amount, etc.

Next, in step 710, terminal 110 determines whether any information, not already included in batch report 300 and relating to service fee 205 based transactions for a particular payment card type, is found in memory or storage associated with terminal 110. If such information is found, step 715 is executed next. Otherwise, step 730 is executed next.

In step 715, terminal 110 writes to batch report 300 a total amount of transactions, i.e., a total amount of money, associated with a particular payment card type for which transactions are processed according to a service fee 205. With reference to FIG. 3, information written in steps 715-725 is generally written to the first sub-report 305. As described below with respect to step 755, batch report 300 is generally printed, e.g., on a roll of paper such as is known for terminal 110. Accordingly, in step 715 and following steps, when information is described as being "written" to batch report 300, it should be understood that such information is being stored in a memory of terminal 110 to be included in batch report 300 when batch report 300 is printed or otherwise displayed to a user.

Next, in step 720, terminal 110 writes to batch report 300 a number of transactions using a service fee 205, based on the number of transactions associated with the card type identified in step 710. Alternatively, if step 720 has already been visited, a number of transactions using a service fee 205 may have already been written to batch report 300, in which case a number associated with the card type identified in step 710 may be added to the already-existing number. Further, although not illustrated in either FIG. 3 or FIG. 7, it is possible for a batch report 300 to include separate lines showing a number of transactions processed for each of the card types for which a total transaction amount is written to batch report 300 as described above with respect to step 715.

Also in step 720, terminal 110 writes to batch report 300 a total amount of service fees 205 and a total amount of transactions, i.e., a total amount of money, associated with all payment card types for which transactions are processed according to a service fee 205. Alternatively, if step 720 has already been visited, such amounts may be simply added to previously written of amounts in a manner similar to that described above.

Next, in step 725, terminal 110 writes to batch report 300 a net deposit amount that is the difference between a total transaction amount associated with a particular payment card type and an amount of service fees 205 associated with the payment card type. That is, the net deposit amount shows the actual amount to be collected by merchant 105 for transactions using service fees 205. The net deposit amount, like the total amounts discussed above with respect to step 720, may be added to in step 725 if a net deposit amount has already been written to batch report 300 in prior visits of process 700 to step 725.

Following step 725, process 700 returns to step 710.

In step 730, which may follow step 710 as described above, terminal 110 determines whether any information, not already included in batch report 300 and relating to percentage-based transaction fee transactions for a particular payment card type, is found in memory or storage associated with terminal 110. If such information is found, step 735 is executed next. Otherwise, step 750 is executed next.

In step 735, terminal 110 writes to batch report 300 a total amount of transactions, i.e., a total amount of money, associated with a particular payment card type for which transactions are processed according to a service fee 205. With reference to FIG. 3, information written in steps 735-745 is generally written to the second sub-report 310.

Next, in step 740, terminal 110 writes to batch report 300 a number of transactions using a percentage-based transaction fee, or adds to such number, similar to the processing described above with respect to step 720. Also in step 740, terminal 110 writes to batch report 300 a total amount of transactions, i.e., a total amount of money, associated with all payment card types for which transactions are processed according to a percentage-based transaction fee, or adds to such number, similar to the processing described above with respect to step 720.

Next, in step 745, terminal 110 writes to batch report 300 a net deposit amount, i.e., a net amount due to merchant 105 for transactions associated with the card type identified in step 730. Generally, this number will be the same as the total amount written in step 740. Accordingly, in some cases, step 745 may be omitted. However, in some cases, it may be desirable to include the number written in step 745 so that sub-reports 305 and 310 will appear consistent.

Step 750 is executed following step 730. In step 750, terminal 110 writes to batch report 300 a total number of transactions processed during the period of time to which batch report 300 is applicable, as well as a total amount, i.e., a total amount of money, of such transactions. For example, referring back to FIG. 3, numbers and amounts of transactions included in sub-reports 305 and 310 may be added together and included in sub-report 315.

Next, in step 755, terminal 110 prints batch report 300 in a known manner. Alternatively, batch report 300 may be provided in a display of terminal 110, or may be sent to some other device, e.g., via network 120, for display and/or printing.

Following step 755, process 700 ends.

Conclusion

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
   storing, in a data store that is included on a computer-readable medium, a set of average transaction amounts;
   determining, for each of the average transaction amounts, a total transaction cost;

establishing an intended per-transaction profit for each of the average transaction amounts based at least in part on the total transaction cost for the average transaction amount;

establishing, in a computer, a service fee for each of the average transaction amounts based on the average transaction amount and the intended per-transaction profit, thereby generating a set of service fees comprising a plurality of service fees; and retrieving data including at least one of the service fees from the data store and sending the data to a payment terminal.

2. The method of claim 1, further comprising:

associating a merchant with one of the average transaction amounts; and processing a payment card transaction for the merchant according to the service fee established for the average transaction amount relating to the merchant.

3. The method of claim 2, further comprising paying a percentage-based fee to a card association based on the payment card transaction.

4. The method of claim 2, further comprising paying to the merchant an amount charged to a customer for the transaction less the service fee established for the average transaction amount relating to the merchant.

5. The method of claim 1, wherein the total transaction cost computed for one of the average transaction amounts includes a fee that is based on a percentage of the average transaction amount.

6. The method of claim 1, wherein each of the average transaction amounts represents a range of average transaction amounts.

7. A system, comprising:

a data store including a fee matrix that includes:

a set of average transaction amounts;

a set of total transaction costs, each of the total transaction costs associated with one of the average transaction amounts; and a set of service fees, one of the service fees associated with each of the average transaction amounts, each service fee based on the associated average transaction amount and an intended per-transaction profit, the intended per-transaction profit based at least in part on the total transaction cost; and a server that is in selective communication with the data store and that is configured to retrieve data from the data store, and to provide data including at least some of the service fees to a payment terminal, whereby a transaction is conducted according to the set of service fees.

8. The system of claim 7, the server being further configured to receive, from a payment terminal at a merchant, an amount of the transaction.

9. The system of claim 8, wherein the payment terminal is a virtual payment terminal.

10. The system of claim 8, the server being further configured to cause a payment to the merchant in the amount of the transaction less a service fee selected from the set of service fees.

11. The system of claim 8, the server being further configured to cause a payment to a card association based on a percentage of the amount of the transaction.

12. The system of claim 7, wherein the total transaction cost computed for one of the average transaction amounts includes a fee that is based on a percentage of the average transaction amount, thereby fixing a transaction fee.

13. The system of claim 7, wherein each of the average transaction amounts represents a range of average transaction amounts.

14. A method, comprising:

storing, in a data store that is included on a computer-readable medium, a service fee to be applied to a payment card transaction submitted by a merchant based at least in part on an average transaction amount associated with the merchant;

receiving, in a computer, from a payment terminal associated with the merchant, information relating to the transaction, the information including an identifier for the merchant, a total amount of the transaction, and an indication that a customer is to be charged the service fee for processing the transaction;

transmitting a payment to a card association based on a percentage of the total amount of the transaction; and transmitting a payment to the merchant in an amount that is the total amount of the transaction less the service fee.

15. The method of claim 14, wherein the information further includes information relating to a payment card used by the customer for the transaction.

16. The method of claim 14, further comprising:

obtaining approval from the card association for the transaction; and transmitting an authorization to the payment terminal.

17. The method of claim 14, wherein the service fee is further based at least in part on a fee based at least in part on a percentage of the average transaction amount.

18. The method of claim 14, wherein the service fee is one of a plurality of service fees, and the average transaction amount is one of a plurality of average transaction amounts, each of the service fees being associated with one of the average transaction amounts.

19. A computer-readable medium tangibly embodying computer-executable instructions, the instructions including instructions for:

determining a service fee to be applied to a payment card transaction submitted by a merchant based at least in part on an average transaction amount associated with the merchant;

receiving, from a payment terminal associated with the merchant, information relating to the transaction, the information including an identifier for the merchant, a total amount of the transaction, and an indication that a customer is to be charged the service fee for processing the transaction;

causing a payment to a card association based on a percentage of the total amount of the transaction; and causing a payment to the merchant in an amount that is the total amount of the transaction less the service fee.

20. The instructions of claim 19, wherein the information further includes information relating to a payment card used by the customer for the transaction.

21. The instructions of claim 19, further comprising:

obtaining approval from the card association for the transaction; and transmitting an authorization to the payment terminal.

22. The instructions of claim 19, wherein the service fee is further based at least in part on a fee based at least in part on a percentage of the average transaction amount.

23. The instructions of claim 19, wherein the service fee is one of a plurality of service fees, and the average transaction amount is one of a plurality of average transaction amounts, each of the service fees being associated with one of the average transaction amounts.

* * * * *